US012597433B2

(12) United States Patent
Yang

(10) Patent No.: US 12,597,433 B2
(45) Date of Patent: Apr. 7, 2026

(54) SPEECH SIGNAL ENHANCEMENT METHOD AND APPARATUS, AND ELECTRONIC DEVICE

(71) Applicant: VIVO MOBILE COMMUNICATION CO., LTD., Guangdong (CN)

(72) Inventor: Hongbo Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 240 days.

(21) Appl. No.: 18/484,927

(22) Filed: Oct. 11, 2023

(65) Prior Publication Data

US 2024/0046947 A1 Feb. 8, 2024

Related U.S. Application Data

(63) Continuation of application No. PCT/CN2022/086098, filed on Apr. 11, 2022.

(30) Foreign Application Priority Data

Apr. 16, 2021 (CN) ......................... 202110410394.8

(51) Int. Cl.
*G10L 21/0232* (2013.01)
*G10L 25/21* (2013.01)

(52) U.S. Cl.
CPC .......... *G10L 21/0232* (2013.01); *G10L 25/21* (2013.01)

(58) Field of Classification Search
None
See application file for complete search history.

(56) References Cited

U.S. PATENT DOCUMENTS 6,014,620 A 1/2000 Handel
6,965,860 B1 11/2005 Rees et al.
(Continued)

FOREIGN PATENT DOCUMENTS

CN 1988738 A 6/2007
CN 102664003 A 9/2012
(Continued)

OTHER PUBLICATIONS

First Office Action for Chinese Application No. 202110410394.8, dated Aug. 12, 2023, 9 Pages.
(Continued)

*Primary Examiner* — Daniel C Washburn
*Assistant Examiner* — Tyler Becker
(74) *Attorney, Agent, or Firm* — BROOKS KUSHMAN P.C.

(57) ABSTRACT

A speech signal enhancement method includes: performing noise reduction processing on a first speech signal according to a first time-frequency spectrum and a first power spectrum to obtain a second speech signal, where the first time-frequency spectrum is used to indicate a time domain feature and a frequency domain feature of the first speech signal, and the first power spectrum is a power spectrum of a noise signal in the first speech signal; determining a voiced signal in the second speech signal, and performing gain compensation on the voiced signal; and determining a damage compensation gain of the second speech signal according to the voiced signal on which the gain compensation has been performed, and performing gain compensation on the second speech signal based on the damage compensation gain.

16 Claims, 4 Drawing Sheets

(56) References Cited

U.S. PATENT DOCUMENTS

| | | | | |
|---|---|---|---|---|
| 2007/0147638 | A1 | 6/2007 | Moon | |
| 2010/0014695 | A1 | 1/2010 | Breithaupt et al. | |
| 2016/0035370 | A1 | 2/2016 | Krini | |
| 2016/0372133 | A1 | 12/2016 | Daniel | |
| 2018/0047390 | A1* | 2/2018 | Yoo | G10L 25/51 |
| 2019/0259381 | A1* | 8/2019 | Ebenezer | H04R 3/005 |
| 2020/0045166 | A1 | 2/2020 | Furuta | |
| 2020/0279573 | A1* | 9/2020 | Hu | G10L 19/008 |
| 2020/0389728 | A1 | 12/2020 | Wang et al. | |
| 2021/0058713 | A1* | 2/2021 | Jensen | H04R 25/453 |
| 2023/0298610 | A1 | 9/2023 | Ba et al. | |

FOREIGN PATENT DOCUMENTS

| | | | | | |
|---|---|---|---|---|---|
| CN | 103456310 | A | | 12/2013 | |
| CN | 104704560 | A | | 6/2015 | |
| CN | 105845150 | A | | 8/2016 | |
| CN | 106257584 | A | | 12/2016 | |
| CN | 107910011 | A | | 4/2018 | |
| CN | 110383798 | A | | 10/2019 | |
| CN | 110875049 | A | | 3/2020 | |
| CN | 111899752 | A | | 11/2020 | |
| CN | 112309418 | A | * | 2/2021 | G10L 21/0232 |
| CN | 113241089 | A | | 8/2021 | |
| WO | WO-2021007841 | A1 | * | 1/2021 | G10L 21/02 |

OTHER PUBLICATIONS

International Search Report and Written Opinion for Application No. PCT /CN2022/086098, dated May 30, 2022, 9 Pages.

* cited by examiner

SPEECH SIGNAL ENHANCEMENT METHOD AND APPARATUS, AND ELECTRONIC DEVICE

CROSS-REFERENCE TO RELATED APPLICATIONS

This application is a continuation of International Application No. PCT/CN2022/086098 filed on Apr. 11, 2022, which claims priority to Chinese Patent Application No. 202110410394.8 filed on Apr. 16, 2021, which are incorporated herein by reference in their entireties.

TECHNICAL FIELD

This application relates to the field of communication technologies, and specifically, to a speech signal enhancement method and apparatus, and an electronic device.

BACKGROUND

With the development of terminal technologies, users have increasingly higher requirements for call quality of electronic devices. In order to improve speech quality obtained by an electronic device during a call, in the conventional speech enhancement technology, the electronic device may obtain a pure original speech signal from a noisy speech signal by reducing noise components in the noisy speech signal, thereby ensuring quality of the obtained speech signal.

However, in the process of reducing the noise components in the noisy speech signal, the quality of the original speech signal in the noisy speech signal may be damaged, resulting in distortion of the original speech signal obtained by the electronic device. Consequently, quality of a speech signal outputted by the electronic device is poor.

SUMMARY

According to a first aspect, an embodiment of this application provides a speech signal enhancement method, including: performing noise reduction processing on a first speech signal according to a first time-frequency spectrum and a first power spectrum to obtain a second speech signal, where the first time-frequency spectrum is used to indicate a time domain feature and a frequency domain feature of the first speech signal, and the first power spectrum is a power spectrum of a noise signal in the first speech signal; determining a voiced signal in the second speech signal, and performing gain compensation on the voiced signal, where the voiced signal is a signal with a cepstral coefficient greater than or equal to a preset threshold in the second speech signal; and determining a damage compensation gain of the second speech signal according to the voiced signal on which the gain compensation has been performed, and performing gain compensation on the second speech signal based on the damage compensation gain.

According to a second aspect, an embodiment of this application provides a speech signal enhancement apparatus, including: a processing module, a determining module, and a compensation module. The processing module is configured to perform noise reduction processing on a first speech signal according to a first time-frequency spectrum and a first power spectrum to obtain a second speech signal, where the first time-frequency spectrum is used to indicate a time domain feature and a frequency domain feature of the first speech signal, and the first power spectrum is a power spectrum of a noise signal in the first speech signal. The determining module is configured to determine a voiced signal in the second speech signal obtained by the processing module, where the voiced signal is a signal with a cepstral coefficient greater than or equal to a preset threshold in the second speech signal. The compensation module is configured to perform gain compensation on the voiced signal determined by the determining module. The determining module is further configured to determine a damage compensation gain of the second speech signal according to the voiced signal on which the gain compensation has been performed. The compensation module is further configured to perform gain compensation on the second speech signal based on the damage compensation gain determined by the determining module.

According to a third aspect, an embodiment of this application provides an electronic device, including a processor, a memory, and a program or an instruction stored in the memory and runnable on the processor, where when the program or the instruction is executed by the processor, the steps of the method according to the first aspect are implemented.

According to a fourth aspect, an embodiment of this application provides a readable storage medium, storing a program or an instruction, where when the program or the instruction is executed by a processor, the steps of the method according to the first aspect are implemented.

According to a fifth aspect, an embodiment of this application provides a chip, including a processor and a communication interface, where the communication interface is coupled to the processor, and the processor is configured to run a program or an instruction to implement the method according to the first aspect.

DETAILED DESCRIPTION

Figure 1:
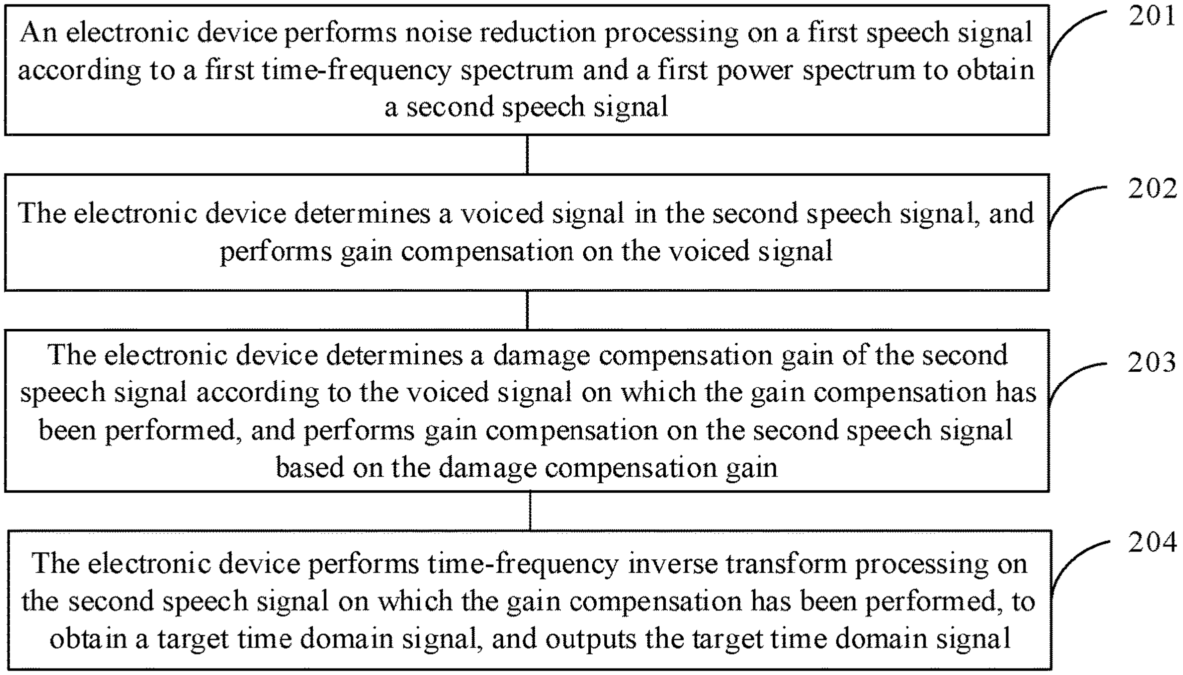
FIG. 1 is a first schematic diagram of a speech signal enhancement method according to an embodiment of this application.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts fall within the protection scope of this application.

In this specification and the claims of this application, the terms "first", "second", and so on are intended to distinguish similar objects, but do not necessarily indicate a specific order or sequence. It should be understood that the data termed in such a way is interchangeable in proper circumstances, so that the embodiments of this application can be implemented in other sequences than the sequence illustrated or described herein. In addition, the objects distinguished by "first", "second", and the like are usually of one type, and there is no limitation on quantities of the objects. For example, there may be one or more first objects. In addition, "and/or" in this specification and the claims indicate at least one of the connected objects, and the character "/" usually indicates an "or" relationship between the associated objects.

Some concepts and/or terms involved in a speech signal enhancement method and apparatus, and an electronic device provided in the embodiments of this application are explained below.

A cepstrum (CEPS) is a spectrum obtained by performing a logarithmic operation and then an inverse Fourier transform on a Fourier transform spectrum of a signal.

Minima controlled recursive averaging (MCRA) is to average past values of a power spectrum by using a smoothing parameter that is adjusted according to a speech presence probability in each subband. If there is a speech signal in a subband of a given frame, a noise power spectrum remains unchanged. If there is no speech signal in a subband of a given frame, a noise estimate of a previous frame is used as a noise estimate of the current frame.

Improved minima controlled recursive averaging (IMCRA) is to perform noise estimation based on MCRA by using two smoothing processing operations and minimum statistic tracking.

A fast Fourier transform (FFT) is a fast algorithm of a discrete Fourier transform and is obtained by improving an algorithm of the discrete Fourier transform according to odd, even, imaginary, and real features of the discrete Fourier transform.

A short-time Fourier transform (STFT) is a mathematical transform related to a Fourier transform and used to determine a frequency and a phase of a sine wave in a local region of a time-varying signal. The short-time Fourier transform is to truncate the original Fourier transform into a plurality of segments in a time domain, and perform the Fourier transform on each segment to obtain a frequency domain feature (that is, to know a correspondence between the time domain and the frequency domain at the same time) of each segment.

Minimum mean-square error (MMSE) estimation is to calculate an estimate of a random variable based on a given observation value, and a commonly used method in the existing estimation theory is to find a transformation function to minimize a mean-square error.

Minimum mean-square error log-spectral amplitude estimation (MMSE-LSA): First, a speech signal is framed according to a quasi-smooth feature of the speech signal, so that each frame of the signal is considered to have a smooth feature, then, a short time-frequency spectrum of each frame of the signal is calculated, and a feature parameter is extracted. Subsequently, a speech detection algorithm is used to determine whether each frame of the signal is a noise signal or a noisy speech signal, and an MMSE method is used to estimate a short-time spectral amplitude of a pure speech signal. Finally, for a short-time spectral phase and an estimated short-time spectral amplitude of the speech signal, the speech signal is reconstructed by using insensitivity of a human ear to a speech phase, to obtain an enhanced speech signal.

A speech signal enhancement method provided in the embodiments of this application is described in detail below through specific embodiments and application scenarios thereof with reference to the accompanying drawings.

In a scenario in which an electronic device makes a voice call, a speech enhancement technology based on speech noise reduction has been gradually applied. In the conventional speech enhancement technology, noise reduction methods based on spectral subtraction, Wiener filtering, and a statistical model are widely used because of their simplicity, effectiveness, and low engineering computation amount. For example, in a single-microphone noise reduction solution, a noise power spectrum in an input signal is estimated to obtain a prior signal-to-noise ratio and a posterior signal-to-noise ratio. Then a conventional noise reduction method is used to calculate a noise reduction gain, and the noise reduction gain is applied to the input signal to obtain a speech signal on which noise reduction processing has been performed. For another example, in a multi-microphone noise reduction solution, spatial information is used to perform beamforming on a plurality of input signals. After a coherent noise is filtered out, a single-microphone noise reduction solution is implemented for a beam-aggregated single-channel signal. A conventional noise reduction method is used to calculate a noise reduction gain, and the noise reduction gain is applied to a beam-aggregated signal to obtain a speech signal on which noise reduction processing has been performed. A technical implementation of the conventional noise reduction method is described below by using the single-microphone noise reduction solution as an example.

A noisy speech signal received by a microphone is:

$$y(t)=x(t)+n(t), \quad \text{(formula 1)}$$

where a clean speech signal is x(t), an additive random noise is n(t), and the noisy speech signal is transformed to a time-frequency domain by framing and windowing and FFT as:

$$Y(f,k)=FFT[y(t)]=X(f,k)+N(f,k), \quad \text{(formula 2)}$$

where k is a frame number.

A posterior signal-to-noise ratio γ(f, k) (which may also be described as γ(f)) is defined as the following formula 3, and a prior signal-to-noise ratio ξ(f, k) (which may also be described as ξ(f)) is defined as the following formula 4, where $P_{nn}$ (f, k) is an estimated value of a noise power spectrum, $P_{yy}$ (f, k) is a power spectrum (known) of the noisy speech signal, and $P_{xx}$ (f, k) is a power spectrum (not known) of the clean speech signal:

$$\gamma(f)=P_{yy}(f)/P_{nn}(f), \quad \text{(formula 3)}$$

$$\xi(f)=P_{xx}(f)/P_{nn}(f) \quad \text{(formula 4)}$$

A common policy for estimating the noise power spectrum is as follows: Speech activity detection is first performed on the input signal (that is, the noisy speech signal). In a time-frequency band of the pure noise signal, a power spectrum of a noise signal in the input signal is equal to a power spectrum of a pure noise signal. In a time-frequency band of a pure speech signal, the power spectrum of the noise signal is not updated. In a time-frequency band between the pure speech signal and the noise signal, the power spectrum of the noise signal is updated according to a specific constant. For the foregoing estimation policy, refer to noise power spectrum estimation methods in MCRA and IMCRA.

The prior signal-to-noise ratio ξ(f, k) may be derived from the posterior signal-to-noise ratio γ(f, k)−1 and obtained through recursive smoothing processing with a prior signal-to-noise ratio ξ(f, k−1) of a previous frame of signal by using a decision-guided method. A specific algorithm is:

$$\xi(f,k)=\alpha*\xi(f,k-1)+(1-\alpha)*\max(0,\gamma(f,k)-1), \quad \text{(formula 5)}$$

where α is a smoothing coefficient.

After obtaining the prior signal-to-noise ratio and the posterior signal-to-noise ratio through calculation according to the noise power spectrum, the noise reduction gain G(f) may be calculated in the following manners:

(1) The noise reduction gain obtained in a form of spectral subtraction is:

$$G_{sub}(f)=\sqrt{\frac{P_{yy}(f)-P_{xx}(f)}{P_{yy}(f)}}=\sqrt{\frac{\xi(f)}{\xi(f)+1}}, \quad \text{(formula 6)}$$

(2) The noise reduction gain obtained in a form of Wiener filtering is:

$$G_{winner}(f)=\frac{P_{xx}}{P_{yy}}=\frac{P_{xx}}{P_{xx}+P_{nn}}=\frac{\xi(f)}{E(f)+1}, \quad \text{(formula 7)}$$

(3) The noise reduction gain obtained in a form of a statistical model (for example, MMSE log amplitude spectrum estimation) is:

$$G_{MMSE-LSA}(f)=\frac{\xi(f)}{\xi(f)+1}\exp\left(\frac{1}{2}\int_{vk}^{\infty}\frac{e^{-t}}{t}dt\right), \quad \text{(formula 8)}$$

where $vk=\frac{\xi(f)}{\xi(f)+1}\gamma(f)$.

The electronic device may obtain, according to the input signal and the noise reduction gain, the speech signal on which noise reduction processing has been performed:

$$\hat{y}(t)=\mathrm{iFFT}[G(f)*Y(f)], \quad \text{(formula 9)}$$

From the foregoing formula for calculating the noise reduction gain, it can be seen that these manners of calculating the noise reduction gain indirectly depend on accurate estimation and tracking of the noise power spectrum. An error transfer process from $P_{nn}$ (f) to G(f) is $P_{nn}$ (f)→γ(f)→ξ(f)→G(f).

Provided that the noise power spectrum is accurately estimated (for example, in a smooth noise scenario), the conventional noise reduction method can obtain sufficient noise reduction gains and ensure relatively small speech distortion. However, in an actual application scenario, such as a large noise and low signal-to-noise ratio scenario (that is, power of a clean speech signal is less than or equal to power of a noise signal) or a scenario in which noise intensity and probability distribution change with time (for example, a car passes by or the subway starts and stops), it is difficult to achieve accurate and real-time noise power spectrum estimation, which is limited by factors such as accuracy and a convergence time of speech activity detection and noise power spectrum estimation methods, leading to a possible deviation in a result of the noise power spectrum estimation.

According to the foregoing error transfer process from the noise power spectrum $P_{nn}$ (f) to the noise reduction gain G(f), it can be learned that:

In a first case, when the noise power spectrum is under-estimated, the prior signal-to-noise ratio is relatively high, and the noise reduction gain generated in the conventional noise reduction method is insufficient. In this case, noise reduction processing has little damage to the clean speech signal, but has a weak capability to suppress the noise signal.

In a second case, when the noise power spectrum is over-estimated, the prior signal-to-noise ratio is relatively low, and the noise reduction gain generated in the conventional noise reduction method is extremely large. In this case, the quality of the clean speech signal is damaged, leading to distortion of the clean speech signal.

To sum up, if it is desired to reduce noise components in the noisy speech signal as much as possible, the problem of damage to the clean speech signal in the second case is inevitable.

To resolve the foregoing technical problem, in this embodiment of this application, the electronic device may perform framing and windowing processing and a fast Fourier transform (FFT) on an obtained noisy speech signal, to convert the noisy speech signal from a time domain signal to a frequency domain signal, to obtain a time-frequency spectrum of the noisy speech signal; then determine a power spectrum of the noisy speech signal according to the time-frequency spectrum of the noisy speech signal; and perform recursive smoothing processing on a minimum value of the power spectrum of the noisy speech signal to obtain a power spectrum of a noise signal in the noisy speech signal, to calculate a noise reduction gain according to the power spectrum of the noise signal, thereby obtaining, according to the noisy speech signal and the noise reduction gain, a speech signal on which noise reduction processing has been performed. After noise reduction processing, the electronic device may convert the speech signal on which noise reduction processing has been performed from a time-frequency domain to a cepstrum domain, perform homomorphic positive analysis on the speech signal on which noise reduction processing has been performed, to obtain cepstral coefficients of the speech signal on which noise reduction processing has been performed, determine a signal corresponding to a larger cepstral coefficient in these cepstral coefficients as a voiced signal, and then perform gain amplification on the cepstral coefficient of the voiced signal to perform gain compensation on the voiced signal, thereby obtaining a logarithmic time-frequency spectrum of an enhanced speech signal. The electronic device may obtain a damage compensation gain according to a difference between logarithmic time-frequency spectrums before and after homomorphic filtering enhancement, to implement, according to the speech signal on which noise reduction processing has been performed and the damage compensation gain, gain compensation for the speech signal on which noise reduction processing has been performed, to obtain a finally enhanced speech signal.

Through this solution, the electronic device may first perform noise reduction processing on a noisy speech signal (for example, the first speech signal) to reduce noise components in the noisy speech signal, thereby obtaining a pure original speech signal. Then, the electronic device may further continue to perform damage gain compensation on the obtained original speech signal to correct speech damage generated during noise reduction processing, thereby obtaining a finally enhanced speech signal. This can avoid a problem of distortion of the original speech signal obtained by the electronic device, thereby improving quality of a speech signal outputted by the electronic device.

An embodiment of this application provides a speech signal enhancement method. FIG. 1 is a flowchart of a speech signal enhancement method according to an embodiment of this application. The method may be applied to an electronic device. As shown in FIG. 1, the speech signal enhancement method provided in this embodiment of this application may include the following step 201 to step 204.

Step 201. The electronic device performs noise reduction processing on a first speech signal according to a first time-frequency spectrum and a first power spectrum to obtain a second speech signal.

In this embodiment of this application, the first time-frequency spectrum is used to indicate a time domain feature and a frequency domain feature of the first speech signal, and the first power spectrum is a power spectrum of a noise signal in the first speech signal.

In this embodiment of this application, in a process in which a user has a voice call through an electronic device, the electronic device may detect in real time a speech signal during the voice call, to obtain a noisy speech signal (for example, a first speech signal), and perform noise reduction processing on the noisy speech signal according to a signal parameter (for example, a time-frequency spectrum of the entire noisy speech signal or a power spectrum of a noise signal in the noisy speech signal) of the noisy speech signal to obtain a speech signal on which noise reduction processing has been performed, thereby implementing gain compensation for the noisy speech signal.

It should be noted that, the first time-frequency spectrum may be understood as a time-frequency spectrum of a frequency domain signal (for example, a frequency domain signal obtained by performing a short-time Fourier transform on the first speech signal in the following embodiment) corresponding to the first speech signal. That the first time-frequency spectrum is used to indicate a time domain feature and a frequency domain feature of the first speech signal may be understood as a case in which the first time-frequency spectrum not only can reflect the time domain feature of the first speech signal, but also can reflect the frequency domain feature of the first speech signal.

Optionally, in this embodiment of this application, before the foregoing step 201, the speech signal enhancement method provided in this embodiment of this application further includes the following step 301 to step 303.

Step 301. The electronic device performs a short-time Fourier transform on the first speech signal to obtain the first time-frequency spectrum.

In this embodiment of this application, the electronic device converts a first speech signal received through a microphone into a digital signal. The digital signal is converted from a time domain signal to a frequency domain signal through the short-time Fourier transform (that is, framing and windowing processing and a fast Fourier transform (FFT)). A specific algorithm is:

$$Y_1(f,=\mathrm{STFT}(y(n)), \quad \text{(formula 10)}$$

where $Y_1$ (f, k) is the frequency domain signal corresponding to the first speech signal, and y(n) is the first speech signal (that is, the time domain signal), so that the time-frequency spectrum of the first speech signal is obtained.

Step 302. The electronic device determines a power spectrum of the first speech signal according to the first time-frequency spectrum, and determines a target power spectrum in the power spectrum of the first speech signal.

In this embodiment of this application, the target power spectrum is a power spectrum of a signal with a smallest power spectrum in signals within a preset time window.

In this embodiment of this application, the electronic device may determine the power spectrum $P_{yy}$ (f, k) of the first speech signal according to the time-frequency spectrum of the first speech signal by using a first preset algorithm (the following formula 11), and determines the power spectrum $P_{ymin}$ (f) (that is, the target power spectrum) of the signal with the smallest power spectrum in the signals within the preset time window. A specific algorithm is shown in the following formula 12:

$$P_{yy}(f,k)=|Y_1(f,k)|^2, \quad \text{(formula 11)}$$

$$P_{ymin}(f)=\min[P_{yy}(f,k),P_{yy}(f,k-1), \ldots P_{yy}(f,k-N_{min})], \quad \text{(formula 12)}$$

where N is an integer less than k (N=0,1,2, . . . , k−1).

It should be noted that, the signals within the preset time window may be the entire first speech signal or a part of the first speech signal.

Step 303. The electronic device performs recursive smoothing processing on the target power spectrum to obtain the first power spectrum.

In this embodiment of this application, the electronic device may perform a s recursive smoothing processing on a target power spectrum $P_{ymin}$ (f), to obtain a power spectrum $P_{nn}$ (f) (that is, the first power spectrum) of a noise signal in the first speech signal. An algorithm of the recursive smoothing processing is:

$$P_{nn}(f,k)=\alpha_s{*}P_{nn}(f,k-1)+(1-\alpha_s){*}P_{ymin}(f), \quad \text{(formula 13)}$$

where a smoothing coefficient $\alpha_s$ is controlled by a speech presence probability of a current frame, and when the speech presence probability is close to 1, $\alpha_s$ is close to 0.

It should be noted that, the noisy speech signal includes a pure speech signal and a noise signal, and a speech presence probability may be estimated for each frame of signal to determine the pure speech signal and the noise signal in the noisy speech signal, that is, which frames of signals are pure speech signals and which frames of signals are noise signals in the noisy speech signal.

In this embodiment of this application, the electronic device may perform the short-time Fourier transform on the first speech signal (that is, the noisy speech signal) picked up by the microphone, to obtain the time-frequency spectrum (that is, the first time-frequency spectrum) of the first speech signal, to determine the power spectrum of the first speech signal according to the first time-frequency spectrum by using the first preset algorithm, and determine, in the power spectrum of the first speech signal, the power spectrum (that is, the target power spectrum) of the signal with the smallest power spectrum in the signals within the preset time window, to perform recursive smoothing processing on the target power spectrum, to obtain the power spectrum (that is, the first power spectrum) of the noise signal in the first speech signal, so that the electronic device can implement noise reduction processing on the first speech signal by using the first time-frequency spectrum and the first power spectrum.

Optionally, in this embodiment of this application, step 201 may be specifically implemented through the following step 201*a* to step 201*c*.

Step 201*a*. The electronic device determines a posterior signal-to-noise ratio corresponding to the first speech signal according to the first power spectrum and the power spectrum of the first speech signal, and performs recursive smoothing processing on the posterior signal-to-noise ratio to obtain a prior signal-to-noise ratio corresponding to the first speech signal.

In this embodiment of this application, the posterior signal-to-noise ratio is expressed as the following formula 14, and the prior signal-to-noise ratio is expressed as the following formula 15, where a smoothing factor α=0.7.

$$\gamma(f,k)=P_{yy}(f,k)/P_{nn}(f,k), \quad \text{(formula 14)}$$

$$\xi(f,k)=\alpha*\xi(f,k-1)+(1-\alpha)*\max(0,\gamma(f,k)-1), \quad \text{(formula 15)}$$

Step 201*b*. The electronic device determines a target noise reduction gain according to the posterior signal-to-noise ratio and the prior signal-to-noise ratio.

$$G_1(f,k)=\frac{\xi(f,k)}{\xi(f,k)+1}\exp\left(\frac{1}{2}\int_{vk(f,k)}^{\infty}\frac{e^{-t}}{t}dt\right), \quad \text{(formula 16)}$$

$$\text{where } vk(f,k)=\frac{\xi(f,k)}{\xi(f,k)+1}\gamma(f,k).$$

Step 201*c*. The electronic device performs noise reduction processing on the first speech signal according to the first time-frequency spectrum and the target noise reduction gain to obtain the second speech signal.

In this embodiment of this application, the electronic device may perform noise reduction processing on the first speech signal (that is, the frequency domain signal corresponding to the first speech signal) according to the first time-frequency spectrum and the target noise reduction gain by using a second preset algorithm (as expressed in the following formula 17), to obtain the second speech signal $Y_2$ (f, k) (that is, a signal obtained by performing noise reduction processing on the frequency domain signal corresponding to the first speech signal):

$$Y_2(f,k)=Y_1(f,k)*G_1(f,k). \quad \text{(formula 17)}$$

In this embodiment of this application, the electronic device may determine, according to the power spectrum of the noise signal in the first speech signal and the power spectrum of the first speech signal, the posterior signal-to-noise ratio corresponding to the first speech signal, and perform recursive smoothing processing on the posterior signal-to-noise ratio to obtain a prior signal-to-noise ratio corresponding to the first speech signal, to determine a target noise reduction gain according to the posterior signal-to-noise ratio and the prior signal-to-noise ratio, thereby performing noise reduction processing on the first speech signal according to the time-frequency spectrum of the first speech signal and the target noise reduction gain by using the second preset algorithm, to obtain a speech signal on which noise reduction processing has been performed. In this way, noise reduction processing is performed on the noisy speech signal to reduce noise components in the noisy speech signal, to obtain a pure original speech signal, thereby improving quality of the speech signal outputted by the electronic device.

Step 202. The electronic device determines a voiced signal in the second speech signal, and performs gain compensation on the voiced signal.

In this embodiment of this application, the voiced signal is a signal with a cepstral coefficient greater than or equal to a preset threshold in the second speech signal.

In this embodiment of this application, the electronic device may first determine a cepstral coefficient of the second speech signal, and then determine a signal with a relatively large cepstral coefficient in the second speech signal as the voiced signal, to perform gain compensation on the voiced signal, thereby implementing gain compensation on the second speech signal.

It may be understood that, the electronic device may preset a decision threshold (that is, the preset threshold) of the voiced signal to determine, in the second speech signal, a signal with a cepstral coefficient greater than or equal to the decision threshold, to determine the signal as the voiced signal. The voiced signal has obvious pitch and harmonic features in time-frequency and cepstrum domains.

Optionally, in this embodiment of this application, step 202 may be specifically implemented through the following step 202*a* to step 202*c*.

Step 202*a*. The electronic device performs homomorphic positive analysis processing on the second speech signal to obtain a target cepstral coefficient of the second speech signal.

In this embodiment of this application, the target cepstral coefficient includes at least one cepstral coefficient, and each cepstral coefficient corresponds to one frame of signal in the second speech signal. It should be noted that, for each frame of signal of the second speech signal, the electronic device may divide the second speech signal into at least one speech segment, and one speech segment may be understood as one frame of signal of the second speech signal.

In this embodiment of this application, the electronic device may perform homomorphic positive analysis processing on a frequency domain signal $Y_2$ (f, k) corresponding to the second speech signal, to obtain a cepstral coefficient Q(c, k) of the second speech signal, where c is a time index of the cepstral coefficient, and a specific algorithm is:

$$Q(c,k)=\text{iFFT}[\log(|Y_2(f_1,k)|,|Y_2(f_2,k)|, \ldots ,|Y_2(f_n,k)|)], \quad \text{(formula 18)}$$

Figure 2:
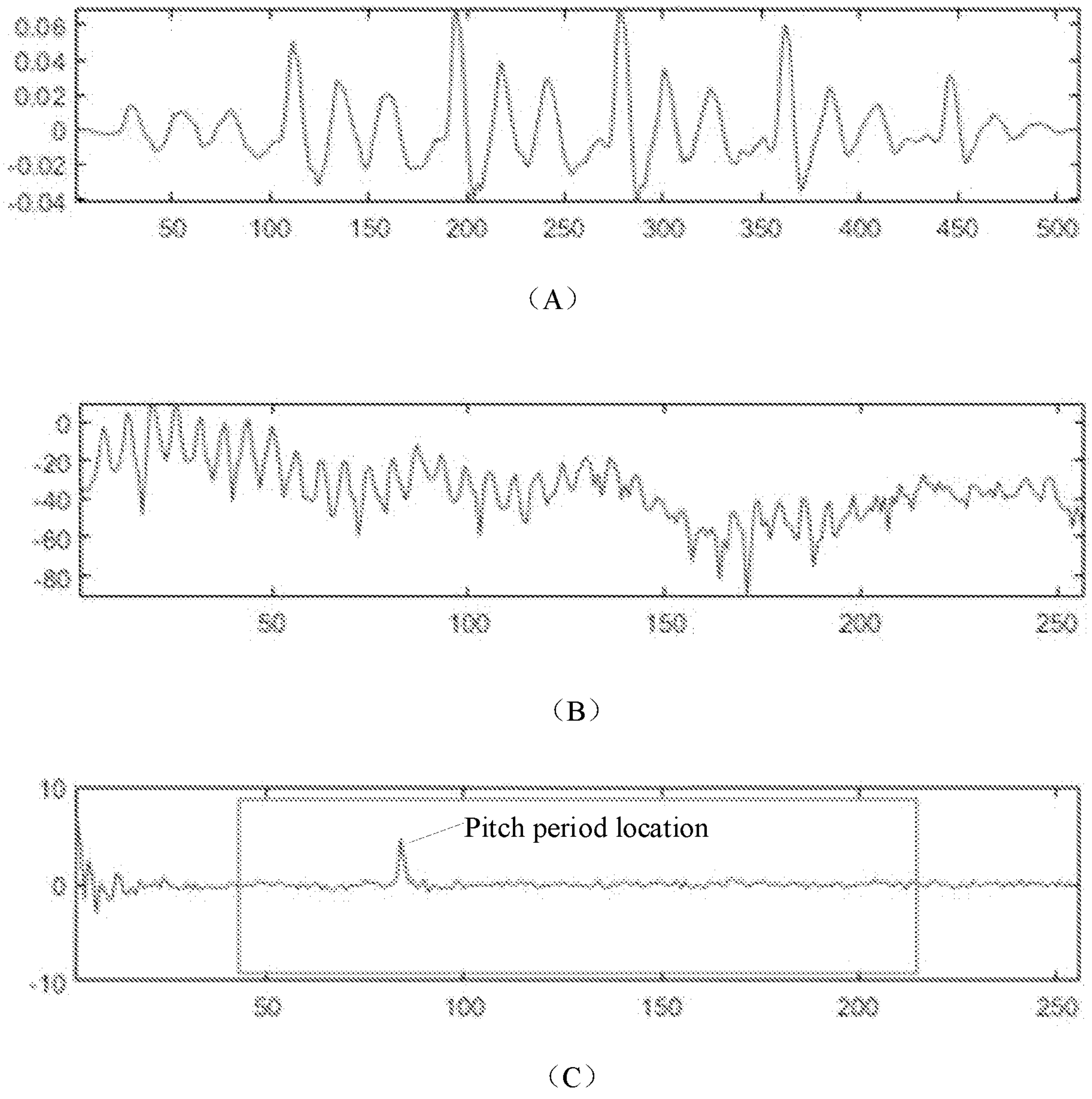
FIG. 2 is a second schematic diagram of a speech signal enhancement method according to an embodiment of this application.

For example, (A) in FIG. 2 is a waveform graph of the first speech signal (which may also be referred to as a noisy speech time domain signal). The electronic device obtains the second speech signal after performing noise reduction processing on the noisy speech time domain signal, and obtains a logarithmic time-frequency spectrum of the second speech signal shown in (B) in FIG. 2 through logarithmic calculation. Then, the electronic device may perform homomorphic positive analysis processing on the second speech signal to obtain a cepstrum (a lateral axis is the time index and a longitudinal axis is the cepstral coefficient) of the second speech signal shown in (C) in FIG. 2.

Step 202*b*. The electronic device determines a maximum cepstral coefficient in the target cepstral coefficient, and determines a signal corresponding to the maximum cepstral coefficient in the second speech signal as the voiced signal.

In this embodiment of this application, each frame of signal in the second speech signal corresponds to one cepstral coefficient. The electronic device can search for a maximum cepstral coefficient from at least one obtained cepstral coefficient, to determine a frame of signal corresponding to the maximum cepstral coefficient as the voiced signal.

Optionally, in this embodiment of this application, the electronic device may preset a speech pitch period search range to [70 Hz-400 Hz]. A cepstral coefficient range corresponding to the speech pitch period search range is [Fs/400–Fs/70], where Fs is a sampling frequency. The electronic device searches for a maximum cepstral coefficient $Q_{max}$ from cepstral coefficients within the range in the target cepstral coefficient, and a time index corresponding thereto is $c_{max}$. Assuming that the decision threshold of the voiced signal is h, when $Q_{max}$ (c, k)>h, it is determined that a signal corresponding to the maximum cepstral coefficient is a voiced signal (for example, a signal corresponding to a pitch period location shown in (C) in FIG. 2). The voiced signal has obvious pitch and harmonic features in frequency and cepstrum domains.

Step 202*c*. The electronic device performs gain amplification processing on the maximum cepstral coefficient, to perform gain compensation on the voiced signal.

In this embodiment of this application, when determining that a frame of signal in the second speech signal is a voiced signal, the electronic device performs gain amplification processing on a maximum cepstral coefficient corresponding to the voiced signal, to implement gain compensation for the voiced signal. A specific algorithm is:

$$Q(c_{max},k)=g*Q(c_{max},k), \qquad \text{(formula 19)}$$

where g is a gain coefficient, and g is used to control a value of a compensation gain. For example, a value of g may be 1.5.

In this embodiment of this application, the electronic device may perform homomorphic positive analysis processing on the second speech signal to obtain cepstral coefficients of the second speech signal, then determine a maximum cepstral coefficient in the cepstral coefficients, and determine a signal corresponding to the maximum cepstral coefficient in the second speech signal as a voiced signal, so that the electronic device can perform gain amplification processing on the maximum cepstral coefficient to implement gain compensation for the voiced signal, thereby facilitating gain compensation on a speech signal on which noise reduction processing has been performed.

Step 203. The electronic device determines a damage compensation gain of the second speech signal according to the voiced signal on which the gain compensation has been performed, and performs gain compensation on the second speech signal based on the damage compensation gain.

Optionally, in this embodiment of this application, that "the electronic device determines a damage compensation gain of the second speech signal according to the voiced signal on which the gain compensation has been performed" in the foregoing step 203 may be specifically implemented through the following step 203*a* and step 203*b*.

Step 203*a*. The electronic device performs homomorphic inverse analysis processing on a first cepstral coefficient and the maximum cepstral coefficient on which the gain amplification processing has been performed, to obtain a first logarithmic time-frequency spectrum.

In this embodiment of this application, the first cepstral coefficient is a cepstral coefficient in the target cepstral coefficient other than the maximum cepstral coefficient.

In this embodiment of this application, the electronic device performs homomorphic inverse analysis processing on the cepstral coefficient in the target cepstral coefficient other than the maximum cepstral coefficient and the maximum cepstral coefficient on which the gain amplification processing has been performed, to obtain a logarithmic time-frequency spectrum $LY_{2E}$ (f, k) (that is, the first logarithmic time-frequency spectrum) of the enhanced second speech signal. A specific algorithm is:

$$LY_{2E}(f,k)=FFT[Q(c_1,k),Q(c_2,k), \ldots Q(c_{max},k), \ldots Q_n(c_n,k)], \qquad \text{(formula 20)}$$

Step 203*b*. The electronic device determines a logarithmic time-frequency spectrum of the second speech signal according to a time-frequency spectrum of the second speech signal, and determines the damage compensation gain according to a difference between the first logarithmic time-frequency spectrum and the logarithmic time-frequency spectrum of the second speech signal.

In this embodiment of this application, the electronic device may determine the logarithmic time-frequency spectrum $LY_2$ (f, k) of the second speech signal according to the time-frequency spectrum of the second speech signal, where a specific algorithm is expressed as the following formula 21; and determine the damage compensation gain according to the difference between the logarithmic time-frequency spectrum of the enhanced second speech signal and the logarithmic time-frequency spectrum of the second speech signal.

$$LY_2(f,k)=\log(|Y_2(f,k)|), \qquad \text{(formula 21)}$$

Specifically, the electronic device may obtain the damage compensation gain by performing F function calculation on logarithmic time-frequency spectrums before and after enhancement of the cepstral coefficients, that is, $$G_c(f,k)=F(LY_2(f,k),LY_{2E}(f,k)), \qquad \text{(formula 22)}$$

It should be noted that, an F function may be implemented in two manners. In a first implementation, the difference between the logarithmic spectrums is converted into a linear coefficient as the damage compensation gain. A specific algorithm is expressed as the following formula 23. In a second implementation, on the basis of calculating the difference between the logarithmic spectrums, a gain constraint range is increased, that is, the difference between the logarithmic spectrums is restricted within the gain constraint range, to control a maximum gain and a minimum gain at each frequency, thereby ensuring that the damage compensation gain $G_c$ (f, k) falls within an appropriate range.

$$G_c(f,k)=10^{\frac{LY_{2E}(f,k)-LY_2(f,k)}{20}} \qquad \text{(formula 23)}$$

Figure 3:
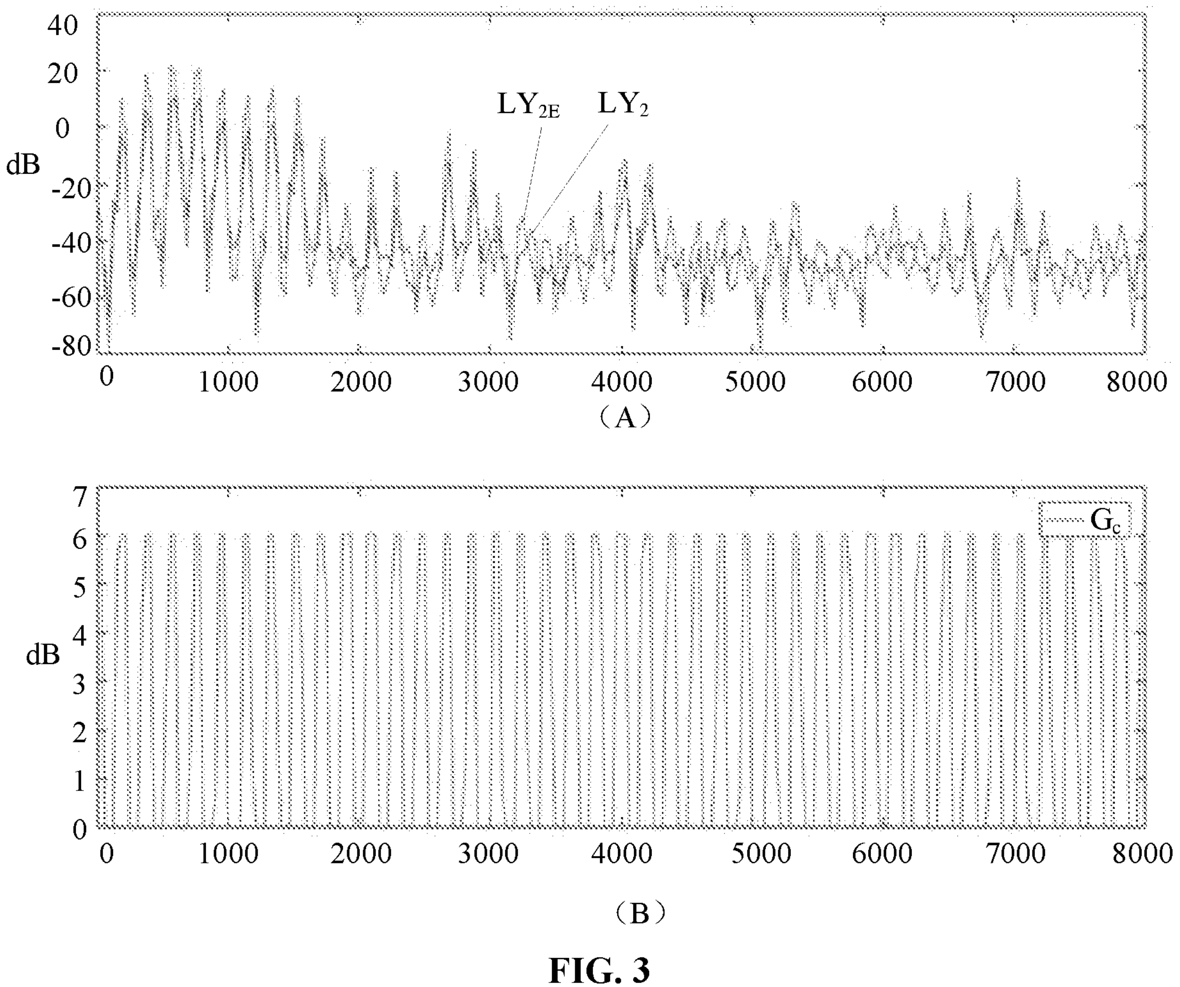
FIG. 3 is a third schematic diagram of a speech signal enhancement method according to an embodiment of this application.

For example, (A) in FIG. 3 shows a logarithmic time-frequency spectrum before and after homomorphic inverse analysis, that is, a logarithmic time-frequency spectrum before and after homomorphic filtering enhancement. After performing gain amplification processing on the maximum cepstral coefficient to perform gain compensation for the voiced signal, the electronic device may continue to perform homomorphic inverse analysis processing on the cepstral coefficient in the target cepstral coefficient other than the maximum cepstral coefficient and the maximum cepstral coefficient on which the gain amplification processing has been performed, to obtain the logarithmic time-frequency spectrum (that is, the first logarithmic time-frequency spectrum) of the enhanced second speech signal shown in (A) in FIG. 3. In (A) in FIG. 3, $LY_2$ is used to represent the logarithmic time-frequency spectrum before the homomorphic filtering enhancement, and $LY_{2E}$ is used to represent the logarithmic time-frequency spectrum after the homomorphic filtering enhancement. The electronic device may determine, according to a difference between the logarithmic time-frequency spectrum (that is, the logarithmic time-frequency spectrum shown by $LY_{2E}$) of the enhanced second speech signal and the logarithmic time-frequency spectrum (that is, the logarithmic time-frequency spectrum shown by $LY_2$) of the second speech signal, a damage compensation gain $G_c$ shown in (B) in FIG. 3, to perform gain compensation on the second speech signal by using the damage compensation gain.

In this embodiment of this application, after performing noise reduction processing on the first speech signal to obtain a second speech signal, the electronic device may further continue to perform gain compensation on a voiced signal in the second speech signal, to determine a damage compensation gain of the second speech signal, so that gain compensation for the second speech signal is implemented based on the damage compensation gain to obtain a finally enhanced speech signal, thereby improving quality of the speech signal.

An embodiment of this application provides a speech signal enhancement method, in which after performing noise reduction processing on a first speech signal according to a time-frequency spectrum of the first speech signal and a power spectrum of a noise signal in the first speech signal to obtain a second speech signal, an electronic device may determine a voiced signal in the second speech signal to perform gain compensation on the voiced signal, and determine a damage compensation gain of the second speech signal according to the voiced signal on which gain compensation has been performed, to perform gain compensation on the second speech signal based on the damage compensation gain. The electronic device may first perform noise reduction processing on a noisy speech signal (for example, the first speech signal) to reduce noise components in the noisy speech signal, thereby obtaining a pure original speech signal. Then, the electronic device may further continue to perform damage gain compensation on the obtained original speech signal to correct speech damage generated during noise reduction processing, thereby obtaining a finally enhanced speech signal. This can avoid a problem of distortion of the original speech signal obtained by the electronic device, thereby improving quality of a speech signal outputted by the electronic device.

The quality of the original speech signal is damaged during noise reduction processing. Therefore, compared with the conventional solution, through this solution, total energy of the outputted speech signal (a signal on which speech enhancement has been performed) is greater than total energy of the inputted speech signal, and a spectrum of a voiced part (including a pitch component and a harmonic component) in the outputted speech signal is larger than a spectrum of the inputted speech signal (that is, the outputted speech signal is enhanced). However, the conventional noise reduction method only attenuates the noise signal in the inputted speech signal, that is, the energy of the outputted speech signal is less than or equal to the energy of the inputted speech signal. Therefore, the quality of the speech signal outputted in this solution is higher than the quality of the speech signal outputted in the conventional solution.

Optionally, in this embodiment of this application, the second speech signal is a signal obtained by performing noise reduction processing on a target frequency domain signal, and the target frequency domain signal is a signal obtained by performing a short-time Fourier transform on the first speech signal. After the foregoing step 203, the speech signal enhancement method provided in this embodiment of this application further includes the following step 204.

Step 204. The electronic device performs time-frequency inverse transform processing on the second speech signal on which the gain compensation has been performed, to obtain a target time domain signal, and outputs the target time domain signal.

In this embodiment of this application, a time-frequency inverse transform is performed on the second speech signal on which gain compensation has been performed (that is, an enhanced frequency domain signal), to obtain a speech-enhanced time domain signal, thereby outputting an enhanced speech signal $Y_3$ (f, k). A specific algorithm is:

$$Y_3(f,k)=Y_1(f,k)*G_1(f,k)*G_c(f,k). \qquad \text{(formula 24)}$$

A specific process of the speech signal enhancement method based on homomorphic filtering provided in the embodiments of this application is described below: In an electronic device with a sound collection function, the electronic device converts a noisy speech signal (for example, a first speech signal) received by a microphone into a digital signal, and then performs framing and windowing process and a fast Fourier transform on the digital signal, to convert the noisy speech signal from a time domain signal to a frequency domain signal, that is, $Y_1$ (f, = STFT(y(n)). Then, the electronic device performs noise power spectrum estimation and noise reduction gain calculation on a time-frequency spectrum of the noisy speech signal. A noise reduction processing process is described by using MCRA and MMSE-LSA as an example. A power spectrum of the noisy speech signal is $P_{yy}(f, k)=|Y_1(f, k)|^2$, and an observation time window is set by using MCRA. The electronic device can observe a minimum value of the power spectrum of the noisy speech signal within the preset time window, that is, $P_{ymin}$ (f)=min [$P_{yy}$ (f, k), $P_{yy}$(f, k−1), $P_{yy}$ (f, k−$N_{min}$)]. The noise power spectrum $P_{nn}$ may be obtained through $\alpha_s$ recursive smoothing processing by using $P_{ymin}$ (f), that is, $P_{nn}(f, k)=\alpha_s*P_{nn}(f, k-1)+(1-\alpha_s)*P_{ymin}$ (f), where the $\alpha_s$ smoothing coefficient is controlled by a speech presence probability of the current frame of signal. When the speech probability is close to 1, a value of $\alpha_s$ is close to 0. The posterior signal-to-noise ratio is defined as $\gamma(f, k)=P_{yy}(f, k)/P_{nn}(f, k)$, and the prior signal-to-noise ratio is defined as $\xi(f, k)=\alpha*\xi(f, k-1)+(1-\alpha)*\max(0, \gamma(f, -1)$, where $\alpha=0.7$. In the MMSE-LSA method, the noise reduction gain $G_1$ (f, k) is obtained through calculation by using the prior signal-to-noise ratio and the posterior signal-to-noise ratio, that is, $$G_1(f, k) = \frac{\xi(f, k)}{\xi(f, k)+1}\exp\left(\frac{1}{2}\int_{vk(f,k)}^{\infty}\frac{e^{-t}}{t}dt\right),$$

$$\text{where } vk(f, k) = \frac{\xi(f, k)}{\xi(f, k)+1}\gamma(f, k).$$

A signal on which noise reduction processing has been performed (that is, a second speech signal) is $Y_2$ (f, k)=$Y_1$ (f, k)*$G_1$ (f, k), and a logarithmic time-frequency spectrum thereof is $LY_2(f, k)=\log(|Y_2(f, k)|)$. The electronic device performs homomorphic positive analysis processing on $Y_2$ (f, k), to obtain a cepstral coefficient Q(c, k) of the signal on which noise reduction processing has been performed, that is, $Q(c, k)=\mathrm{iFFT}[\log(|Y_2(f_1, k)|, |Y_2(f_2, k)|, \ldots, |Y_2(f_n, k)|)]$, where c is a time index of the cepstral coefficient. The electronic device may preset a speech pitch period search range to [70 Hz-400 Hz], preset a corresponding cepstral coefficient range to [Fs/400–Fs/70], and search for a maximum cepstral coefficient within the search range and denote it as $Q_{max}$. A time index corresponding thereto is denoted as $c_{max}$, and a decision threshold of a voiced signal is set to h. When $Q_{max}$ (c, k)>h, the current frame of signal is determined as a voiced signal, that is, the current frame of signal has obvious pitch and harmonic features in frequency and cepstrum domains. When the current frame of signal is determined as a voiced signal, the electronic device performs gain amplification on a cepstral coefficient corresponding to the location of $c_{max}$ (that is, a cepstral coefficient of the voiced signal), that is, $Q(c_{max}, k)=g*Q(c_{max}, k)$, where g is a gain coefficient. The electronic device may control a value of a compensation gain through g. For example, a value of g may be 1.5. The electronic device performs homomorphic inverse analysis processing on a cepstral coefficient within the search range other than the maximum cepstral coefficient and the maximum cepstral coefficient on which gain amplification processing has been performed, to obtain an enhanced logarithmic time-frequency spectrum, that is, $LY_{2E}$ (f, k)=FFT[Q($c_1$, k), Q($c_2$, k), . . . Q($c_{max}$, k), . . . $Q_n$ ($c_n$, k)]. A speech damage compensation gain may be obtained by performing F function calculation on logarithmic time-frequency spectrums before and after the cepstral coefficient gain, that is, $G_c$ (f, k)=F($LY_2$ (f, k), $LY_{2E}$ (f, k)). The F function may be implemented in a plurality of manners. In one implementation, a difference between logarithmic spectrums is converted into a linear coefficient as the damage compensation gain, that is, $$G_c(f, k) = 10^{\frac{LY_{2E}(f,k)-LY_2(f,k)}{20}}.$$

In another implementation, on the basis of the difference between the logarithmic spectrums, a gain constraint range is increased, that is, the difference between the logarithmic spectrums is restricted within the gain constraint range, to control a maximum gain and a minimum gain at each frequency, thereby ensuring that a value of the damage compensation gain $G_c$ (f, k) falls within an appropriate range. Through the foregoing process, the electronic device obtains a finally speech-enhanced signal $Y_3$ (f, k)=$Y_1$ (f, k)*$G_1$ (f, k)*$G_c$ (f, k), and performs time-frequency inverse transform processing on the finally speech-enhanced signal $Y_3$ (f, k), to obtain a speech-enhanced time domain signal.

It should be noted that, the speech signal enhancement method provided in this embodiment of this application may be performed by the speech signal enhancement apparatus, or a control module in the speech signal enhancement apparatus for performing the speech signal enhancement method. In this embodiment of this application, that the speech signal enhancement apparatus performs the speech signal enhancement method is used as an example to describe the speech signal enhancement apparatus provided in this embodiment of this application.

Figure 4:
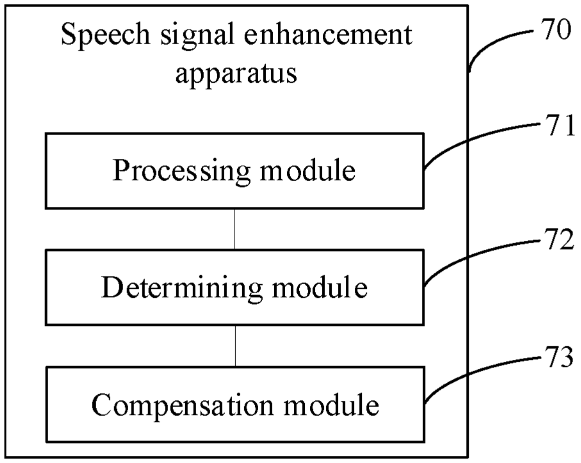
FIG. 4 is a schematic structural diagram of a speech signal enhancement apparatus according to an embodiment of this application.

FIG. 4 is a possible schematic structural diagram of a speech signal enhancement apparatus according to an embodiment of this application. As shown in FIG. 4, the speech signal enhancement apparatus 70 may include: a processing module 71, a determining module 72, and a compensation module 73.

The processing module 71 is configured to perform noise reduction processing on a first speech signal according to a first time-frequency spectrum and a first power spectrum to obtain a second speech signal, where the first time-frequency spectrum is used to indicate a time domain feature and a frequency domain feature of the first speech signal, and the first power spectrum is a power spectrum of a noise signal in the first speech signal. The determining module 72 is configured to determine a voiced signal in the second speech signal obtained by the processing module 71, where the voiced signal is a signal with a cepstral coefficient greater than or equal to a preset threshold in the second speech signal. The compensation module 73 is configured to perform gain compensation on the voiced signal determined by the determining module 72. The determining module 72 is further configured to determine a damage compensation gain of the second speech signal according to the voiced signal on which the gain compensation has been performed. The compensation module 73 is further configured to perform gain compensation on the second speech signal based on the damage compensation gain determined by the determining module 72.

An embodiment of this application provides a speech signal enhancement apparatus. Noise reduction processing may be first performed on a noisy speech signal (for example, the first speech signal) to reduce noise components in the noisy speech signal, thereby obtaining a pure original speech signal. Then, damage gain compensation may be further performed on the obtained original speech signal to correct speech damage generated during noise reduction processing, thereby obtaining a finally enhanced speech signal. This can avoid a problem of distortion of the obtained original speech signal, thereby improving quality of an outputted speech signal.

In a possible implementation, the processing module 71 is further configured to: before performing noise reduction processing on the first speech signal according to the first time-frequency spectrum and the first power spectrum, perform a short-time Fourier transform on the first speech signal to obtain the first time-frequency spectrum. The determining module 72 is further configured to determine a power spectrum of the first speech signal according to the first time-frequency spectrum, and determine a target power spectrum in the power spectrum of the first speech signal, where the target power spectrum is a power spectrum of a signal with a smallest power spectrum in signals within a preset time window. The processing module 71 is further configured to perform recursive smoothing processing on the target power spectrum determined by the determining module 72 to obtain the first power spectrum.

In a possible implementation, the processing module 71 is specifically configured to determine a posterior signal-to-noise ratio corresponding to the first speech signal according to the first power spectrum and the power spectrum of the first speech signal, and perform recursive smoothing processing on the posterior signal-to-noise ratio to obtain a prior signal-to-noise ratio corresponding to the first speech signal; determine a target noise reduction gain according to the posterior signal-to-noise ratio and the prior signal-to-noise ratio; and perform noise reduction processing on the first speech signal according to the first time-frequency spectrum and the target noise reduction gain.

In a possible implementation, the compensation module 73 is specifically configured to perform homomorphic positive analysis processing on the second speech signal to obtain a target cepstral coefficient of the second speech signal; determine a maximum cepstral coefficient in the target cepstral coefficient, and determine a signal corresponding to the maximum cepstral coefficient in the second speech signal as the voiced signal; and perform gain amplification processing on the maximum cepstral coefficient, to perform gain compensation on the voiced signal.

In a possible implementation, the compensation module 73 is specifically configured to perform homomorphic inverse analysis processing on a first cepstral coefficient and the maximum cepstral coefficient on which the gain amplification processing has been performed, to obtain a first logarithmic time-frequency spectrum, where the first cepstral coefficient is a cepstral coefficient in the target cepstral coefficient other than the maximum cepstral coefficient; and determine a logarithmic time-frequency spectrum of the second speech signal according to a time-frequency spectrum of the second speech signal, and determine the damage compensation gain according to a difference between the first logarithmic time-frequency spectrum and the logarithmic time-frequency spectrum of the second speech signal.

In a possible implementation, the second speech signal is a signal obtained by performing noise reduction processing on a target frequency domain signal, and the target frequency domain signal is a signal obtained by performing a short-time Fourier transform on the first speech signal. The speech signal enhancement apparatus 70 provided in this embodiment of this application further includes an output module. The processing module 71 is specifically configured to: after the compensation module 73 performs gain compensation on the second speech signal based on the damage compensation gain, perform time-frequency inverse transform processing on the second speech signal on which the gain compensation has been performed, to obtain a target time domain signal. The output module is configured to output the target time domain signal obtained by the processing module 71.

The speech signal enhancement apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), a teller machine, or an automated machine. This is not specifically limited in this embodiment of this application.

The speech signal enhancement apparatus in this embodiment of this application may be an apparatus with an operating system. The operating system may be an Android operating system, an iOS operating system, or another possible operating system. This is not specifically limited in this embodiment of this application.

The speech signal enhancement apparatus provided in this embodiment of this application can implement the processes implemented by the foregoing method embodiment and achieve the same technical effect. To avoid repetition, details are not described herein again.

Figure 5:
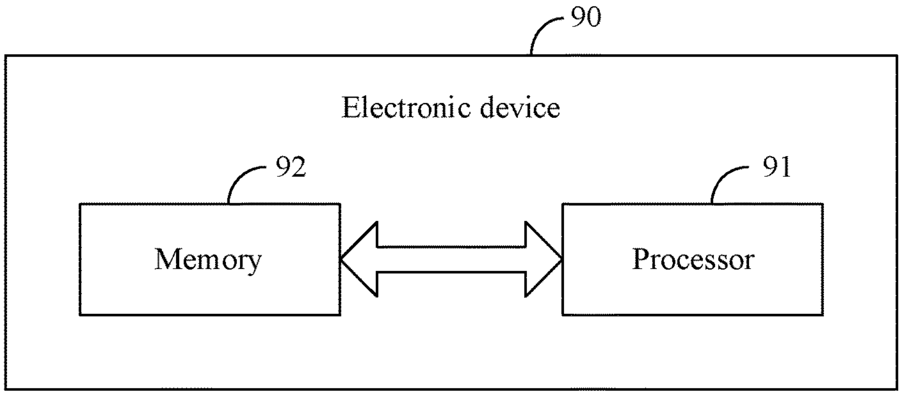
FIG. 5 is a first schematic diagram of a hardware structure of an electronic device according to an embodiment of this application.

Optionally, as shown in FIG. 5, an embodiment of this application further provides an electronic device 90, including a processor 91, a memory 92, and a program or an instruction stored on the memory 92 and runnable on the processor 91. The program or the instruction, when executed by the processor 91, implements the processes of the foregoing method embodiment, and the same technical effects can be achieved. To avoid repetition, details are not described herein again.

It should be noted that, the electronic device in this embodiment of this application includes the mobile electronic device and the non-mobile electronic device described above.

Figure 6:
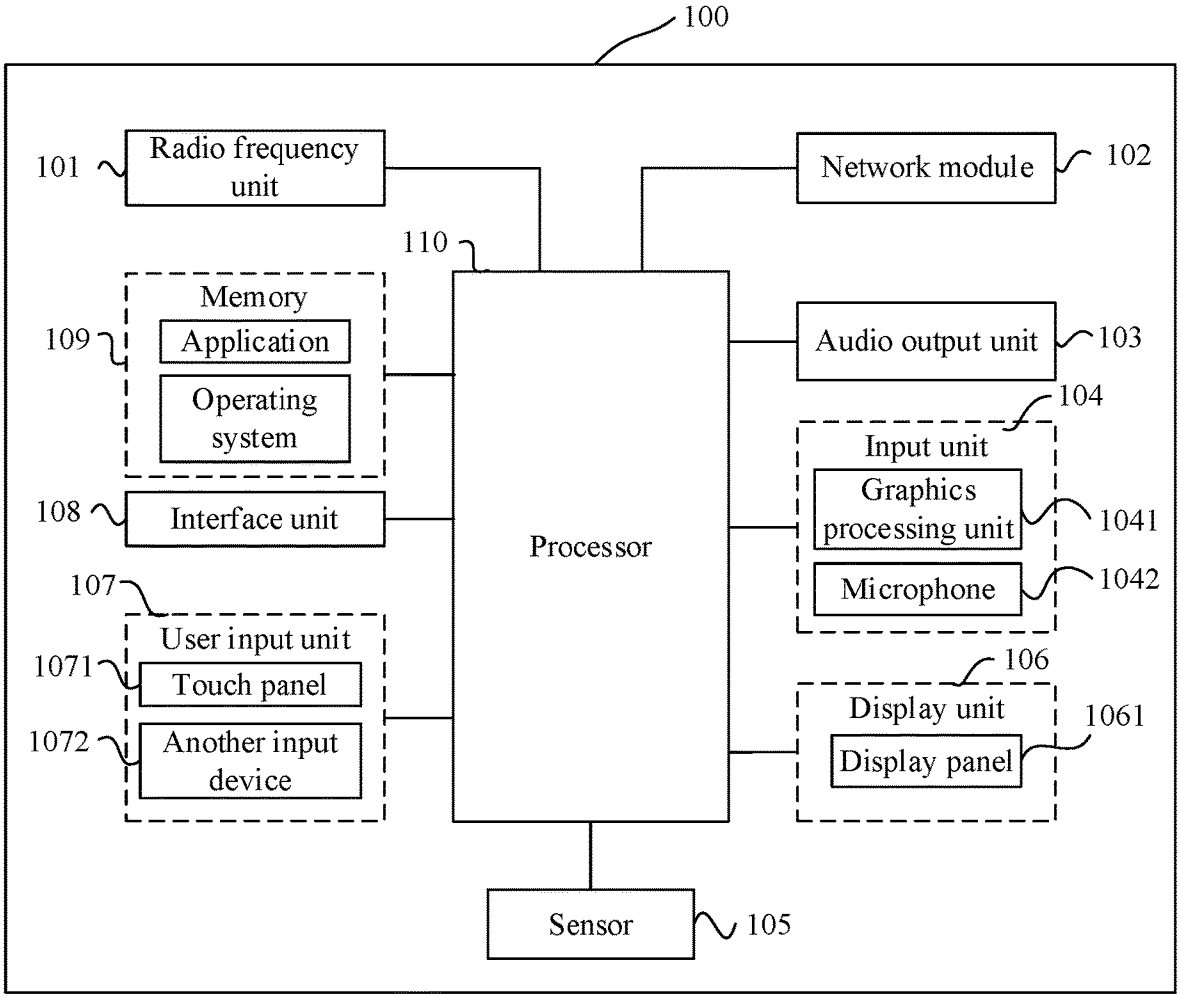
FIG. 6 is a second schematic diagram of a hardware structure of an electronic device according to an embodiment of this application.

FIG. 6 is a schematic diagram of a hardware structure of an electronic device for implementing an embodiment of this application.

The electronic device 100 includes, but is not limited to: a radio frequency unit 101, a network module 102, an audio output unit 103, an input unit 104, a sensor 105, a display unit 106, a user input unit 107, an interface unit 108, a memory 109, a processor 110, and other components.

A person skilled in the art may understand that, the electronic device 100 may further include a power supply (such as a battery) for supplying power to each component. The power supply may be logically connected to the processor 110 by using a power management system, thereby implementing functions, such as charging, discharging, and power consumption management, by using the power management system. The structure of the electronic device shown in FIG. 6 constitutes no limitation on the electronic device, and the electronic device may include more or fewer components than those shown in the figure, or some components may be combined, or a different component deployment may be used. Details are not described herein again.

The processor 110 is configured to perform noise reduction processing on a first speech signal according to a first time-frequency spectrum and a first power spectrum to obtain a second speech signal, where the first time-frequency spectrum is used to indicate a time domain feature and a frequency domain feature of the first speech signal, and the first power spectrum is a power spectrum of a noise signal in the first speech signal; determine a voiced signal in the second speech signal, and perform gain compensation on the voiced signal, where the voiced signal is a signal with a cepstral coefficient greater than or equal to a preset threshold in the second speech signal; and determine a damage compensation gain of the second speech signal according to the voiced signal on which the gain compensation has been performed, and perform gain compensation on the second speech signal based on the damage compensation gain.

An embodiment of this application provides an electronic device. The electronic device may first perform noise reduction processing on a noisy speech signal (for example, the first speech signal) to reduce noise components in the noisy speech signal, thereby obtaining a pure original speech signal. Then, the electronic device may further continue to perform damage gain compensation on the obtained original speech signal to correct speech damage generated during noise reduction processing, thereby obtaining a finally enhanced speech signal. This can avoid a problem of distortion of the original speech signal obtained by the electronic device, thereby improving quality of a speech signal outputted by the electronic device.

Optionally, in this embodiment of this application, the processor 110 is further configured to: before performing noise reduction processing on the first speech signal according to the first time-frequency spectrum and the first power spectrum, perform a short-time Fourier transform on the first speech signal to obtain the first time-frequency spectrum; determine a power spectrum of the first speech signal according to the first time-frequency spectrum, and determine a target power spectrum in the power spectrum of the first speech signal, where the target power spectrum is a power spectrum of a signal with a smallest power spectrum in signals within a preset time window; and perform recursive smoothing processing on the target power spectrum to obtain the first power spectrum.

Optionally, in this embodiment of this application, the processor 110 is specifically configured to determine a posterior signal-to-noise ratio corresponding to the first speech signal according to the first power spectrum and the power spectrum of the first speech signal, and perform recursive smoothing processing on the posterior signal-to-noise ratio to obtain a prior signal-to-noise ratio corresponding to the first speech signal; determine a target noise reduction gain according to the posterior signal-to-noise ratio and the prior signal-to-noise ratio; and perform noise reduction processing on the first speech signal according to the first time-frequency spectrum and the target noise reduction gain.

Optionally, in this embodiment of this application, the processor 110 is specifically configured to perform homomorphic positive analysis processing on the second speech signal to obtain a target cepstral coefficient of the second speech signal; determine a maximum cepstral coefficient in the target cepstral coefficient, and determine a signal corresponding to the maximum cepstral coefficient in the second speech signal as the voiced signal; and perform gain amplification processing on the maximum cepstral coefficient, to perform gain compensation on the voiced signal.

Optionally, in this embodiment of this application, the processor 110 is specifically configured to perform homomorphic inverse analysis processing on a first cepstral coefficient and the maximum cepstral coefficient on which the gain amplification processing has been performed, to obtain a first logarithmic time-frequency spectrum, where the first cepstral coefficient is a cepstral coefficient in the target cepstral coefficient other than the maximum cepstral coefficient; and determine a logarithmic time-frequency spectrum of the second speech signal according to a time-frequency spectrum of the second speech signal, and determine the damage compensation gain according to a difference between the first logarithmic time-frequency spectrum and the logarithmic time-frequency spectrum of the second speech signal.

Optionally, in this embodiment of this application, the second speech signal is a signal obtained by performing noise reduction processing on a target frequency domain signal, and the target frequency domain signal is a signal obtained by performing a short-time Fourier transform on the first speech signal. The processor 110 is specifically configured to: after gain compensation is performed on the second speech signal based on the damage compensation gain, perform time-frequency inverse transform processing on the second speech signal on which the gain compensation has been performed, to obtain a target time domain signal. The audio output unit 103 is configured to output the target time domain signal.

The electronic device provided in this embodiment of this application can implement the processes implemented by the foregoing method embodiment and the same technical effect can be achieved. To avoid repetition, details are not described herein again.

For details of beneficial effects of various implementations in this embodiment, refer to the beneficial effects of the corresponding implementations in the foregoing method embodiments. To avoid repetition, details are not described herein again.

It should be understood that, in this embodiment of this application, the input unit 104 may include a graphics processing unit (GPU) 1041 and a microphone 1042. The graphics processing unit 1041 processes image data from static pictures or videos captured by an image capture apparatus (such as a camera) in a video capture mode or an image capture mode. The display unit 106 may include a display panel 1061. The display panel 1061 may be configured in a form of a liquid crystal display, an organic light-emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include, but is not limited to, a physical keyboard, a functional button (such as a sound volume control button or a power button), a trackball, a mouse, or a joystick. Details are not described herein. The memory 109 may be configured to store a software program and various data, including, but not limited to, an application and an operating system. The processor 110 may integrate an application processor and a modem processor. The application processor mainly processes an operating system, a user interface, an application, and the like. The modem processor mainly processes wireless communication. It may be understood that, the modem processor may alternatively not be integrated into the processor 110.

An embodiment of this application further provides a readable storage medium, storing a program or an instruction, where the program or the instruction, when being executed by a processor, implements the processes of the foregoing method embodiment, and the same technical effects can be achieved. To avoid repetition, details are not described herein again.

The processor may be the processor in the electronic device described in the foregoing embodiment. The readable storage medium includes a computer-readable storage medium, such as a computer read-only memory (ROM), a random access memory (RAM), a magnetic disk, an optical disc, and the like.

An embodiment of this application further provides a chip, including a processor and a communication interface, where the communication interface is coupled to the processor, and the processor is configured to run a program or an instruction to implement the processes of the foregoing method embodiment, and the same technical effects can be achieved. To avoid repetition, details are not described herein again.

It should be understood that, the chip mentioned in this embodiment of this application may also be referred to as a system on a chip, a system chip, a chip system, a system-on-chip, or the like.

It should be noted that, the term "include", "comprise", or any other variation thereof in this specification is intended to cover a non-exclusive inclusion, so that a process, method, article, or device including a series of elements includes not only those elements but also other elements not explicitly listed, or elements inherent to such a process, method, article, or device. Without more restrictions, the elements defined by the sentence "including a . . . " do not exclude the existence of other identical elements in the process, method, article, or device including the elements. In addition, it should be noted that, the scope of the methods and apparatuses in the implementations of this application is not limited to performing the functions in the order shown or discussed, but may further include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions in the foregoing implementations, a person skilled in the art may clearly learn that the method according to the foregoing embodiment may be implemented by software plus a necessary universal hardware platform, or by using hardware, but in many cases, the former is a preferred implementation. Based on such an understanding, the technical solutions of this application essentially or the part contributing to the related art may be implemented in the form of a computer software product. The computer software product is stored in a storage medium (such as a read-only memory (ROM)/random access memory (RAM), a magnetic disk, or an optical disc), and includes several instructions for instructing a terminal (which may be a mobile phone, a computer, a server, a network device, or the like) to perform the method described in the embodiments of this application.

The embodiments of this application have been described above with reference to the accompanying drawings, but this application is not limited to the foregoing specific implementations. The foregoing specific implementations are only illustrative and not restrictive. Under the inspiration of this application, without departing from the purpose of this application and the scope of protection of the claims, a person of ordinary skill in the art can still make many forms, which all fall within the protection of this application.

What is claimed is:

1. A speech signal enhancement method, comprising:

performing noise reduction processing on a first speech signal according to a first time-frequency spectrum and a first power spectrum to obtain a second speech signal, wherein the first time-frequency spectrum is used to indicate a time domain feature and a frequency domain feature of the first speech signal, and the first power spectrum is a power spectrum of a noise signal in the first speech signal;

determining a voiced signal in the second speech signal, and performing gain compensation on the voiced signal, wherein the voiced signal is a signal with a cepstral coefficient greater than or equal to a preset threshold in the second speech signal; and determining a damage compensation gain of the second speech signal according to the voiced signal on which the gain compensation has been performed, and performing gain compensation on the second speech signal based on the damage compensation gain;

wherein the determining a voiced signal in the second speech signal, and performing gain compensation on the voiced signal comprises:

performing homomorphic positive analysis processing on the second speech signal to obtain a target cepstral coefficient of the second speech signal:

determining a maximum cepstral coefficient in the target cepstral coefficient, and determining a signal corresponding to the maximum cepstral coefficient in the second speech signal as the voiced signal; and performing gain amplification processing on the maximum cepstral coefficient, to perform gain compensation on the voiced signal.

2. The method according to claim 1, wherein before the performing noise reduction processing on a first speech signal according to a first time-frequency spectrum and a first power spectrum, the method further comprises:

performing a short-time Fourier transform on the first speech signal to obtain the first time-frequency spectrum;

determining a power spectrum of the first speech signal according to the first time-frequency spectrum, and determining a target power spectrum in the power spectrum of the first speech signal, wherein the target power spectrum is a power spectrum of a signal with a smallest power spectrum in signals within a preset time window; and performing recursive smoothing processing on the target power spectrum to obtain the first power spectrum.

3. The method according to claim 1, wherein the performing noise reduction processing on a first speech signal according to a first time-frequency spectrum and a first power spectrum comprises:

determining a posterior signal-to-noise ratio corresponding to the first speech signal according to the first power spectrum and the power spectrum of the first speech signal, and performing recursive smoothing processing on the posterior signal-to-noise ratio to obtain a prior signal-to-noise ratio corresponding to the first speech signal;

determining a target noise reduction gain according to the posterior signal-to-noise ratio and the prior signal-to-noise ratio; and performing noise reduction processing on the first speech signal according to the first time-frequency spectrum and the target noise reduction gain.

4. The method according to claim 1, wherein the determining a damage compensation gain of the second speech signal according to the voiced signal on which the gain compensation has been performed comprises:

performing homomorphic inverse analysis processing on a first cepstral coefficient and the maximum cepstral coefficient on which the gain amplification processing has been performed, to obtain a first logarithmic time-frequency spectrum, wherein the first cepstral coefficient is a cepstral coefficient in the target cepstral coefficient other than the maximum cepstral coefficient; and determining a logarithmic time-frequency spectrum of the second speech signal according to a time-frequency spectrum of the second speech signal, and determining the damage compensation gain according to a difference between the first logarithmic time-frequency spectrum and the logarithmic time-frequency spectrum of the second speech signal.

5. The method according to claim 1, wherein the second speech signal is a signal obtained by performing noise reduction processing on a target frequency domain signal, and the target frequency domain signal is a signal obtained by performing a short-time Fourier transform on the first speech signal; and after the performing gain compensation on the second speech signal based on the damage compensation gain, the method further comprises:

performing time-frequency inverse transform processing on the second speech signal on which the gain compensation has been performed, to obtain a target time domain signal, and outputting the target time domain signal.

6. A chip, comprising a processor and a communication interface, wherein the communication interface is coupled to the processor, and the processor is configured to run a program or an instruction to implement the speech signal enhancement method according to claim 1.

7. An electronic device, comprising a processor, a memory, and a program or an instruction stored in the memory and runnable on the processor, wherein the program or the instruction is executed by the processor to implement:

performing noise reduction processing on a first speech signal according to a first time-frequency spectrum and a first power spectrum to obtain a second speech signal, wherein the first time-frequency spectrum is used to indicate a time domain feature and a frequency domain feature of the first speech signal, and the first power spectrum is a power spectrum of a noise signal in the first speech signal;

determining a voiced signal in the second speech signal, and performing gain compensation on the voiced signal, wherein the voiced signal is a signal with a cepstral coefficient greater than or equal to a preset threshold in the second speech signal; and determining a damage compensation gain of the second speech signal according to the voiced signal on which the gain compensation has been performed, and performing gain compensation on the second speech signal based on the damage compensation gain;

wherein the determining a voiced signal in the second speech signal, and performing gain compensation on the voiced signal comprises:

performing homomorphic positive analysis processing on the second speech signal to obtain a target cepstral coefficient of the second speech signal;

determining a maximum cepstral coefficient in the target cepstral coefficient, and determining a signal corresponding to the maximum cepstral coefficient in the second speech signal as the voiced signal; and performing gain amplification processing on the maximum cepstral coefficient, to perform gain compensation on the voiced signal.

8. The electronic device according to claim 7, wherein before the performing noise reduction processing on a first speech signal according to a first time-frequency spectrum and a first power spectrum, the method further comprises:

performing a short-time Fourier transform on the first speech signal to obtain the first time-frequency spectrum;

determining a power spectrum of the first speech signal according to the first time-frequency spectrum, and determining a target power spectrum in the power spectrum of the first speech signal, wherein the target power spectrum is a power spectrum of a signal with a smallest power spectrum in signals within a preset time window; and performing recursive smoothing processing on the target power spectrum to obtain the first power spectrum.

9. The electronic device according to claim 7, wherein the performing noise reduction processing on a first speech signal according to a first time-frequency spectrum and a first power spectrum comprises:

determining a posterior signal-to-noise ratio corresponding to the first speech signal according to the first power spectrum and the power spectrum of the first speech signal, and performing recursive smoothing processing on the posterior signal-to-noise ratio to obtain a prior signal-to-noise ratio corresponding to the first speech signal;

determining a target noise reduction gain according to the posterior signal-to-noise ratio and the prior signal-to-noise ratio; and performing noise reduction processing on the first speech signal according to the first time-frequency spectrum and the target noise reduction gain.

10. The electronic device according to claim 7, wherein the determining a damage compensation gain of the second speech signal according to the voiced signal on which the gain compensation has been performed comprises:

performing homomorphic inverse analysis processing on a first cepstral coefficient and the maximum cepstral coefficient on which the gain amplification processing has been performed, to obtain a first logarithmic time-frequency spectrum, wherein the first cepstral coefficient is a cepstral coefficient in the target cepstral coefficient other than the maximum cepstral coefficient; and determining a logarithmic time-frequency spectrum of the second speech signal according to a time-frequency spectrum of the second speech signal, and determining the damage compensation gain according to a difference between the first logarithmic time-frequency spectrum and the logarithmic time-frequency spectrum of the second speech signal.

11. The electronic device according to claim 7, wherein the second speech signal is a signal obtained by performing noise reduction processing on a target frequency domain signal, and the target frequency domain signal is a signal obtained by performing a short-time Fourier transform on the first speech signal; and after the performing gain compensation on the second speech signal based on the damage compensation gain, the method further comprises:

performing time-frequency inverse transform processing on the second speech signal on which the gain compensation has been performed, to obtain a target time domain signal, and outputting the target time domain signal.

12. A non-transitory readable storage medium, storing a program or an instruction, wherein when the program or the instruction is executed by a processor, following steps are implemented:

performing noise reduction processing on a first speech signal according to a first time-frequency spectrum and a first power spectrum to obtain a second speech signal, wherein the first time-frequency spectrum is used to indicate a time domain feature and a frequency domain feature of the first speech signal, and the first power spectrum is a power spectrum of a noise signal in the first speech signal;

determining a voiced signal in the second speech signal, and performing gain compensation on the voiced signal, wherein the voiced signal is a signal with a cepstral coefficient greater than or equal to a preset threshold in the second speech signal; and determining a damage compensation gain of the second speech signal according to the voiced signal on which the gain compensation has been performed, and performing gain compensation on the second speech signal based on the damage compensation gain;

wherein the determining a voiced signal in the second speech signal, and performing gain compensation on the voiced signal comprises:

performing homomorphic positive analysis processing on the second speech signal to obtain a target cepstral coefficient of the second speech signal;

determining a maximum cepstral coefficient in the target cepstral coefficient, and determining a signal corresponding to the maximum cepstral coefficient in the second speech signal as the voiced signal; and performing gain amplification processing on the maximum cepstral coefficient, to perform gain compensation on the voiced signal.

13. The non-transitory readable storage medium according to claim 12, wherein before the performing noise reduction processing on a first speech signal according to a first time-frequency spectrum and a first power spectrum, the method further comprises:

performing a short-time Fourier transform on the first speech signal to obtain the first time-frequency spectrum;

determining a power spectrum of the first speech signal according to the first time-frequency spectrum, and determining a target power spectrum in the power spectrum of the first speech signal, wherein the target power spectrum is a power spectrum of a signal with a smallest power spectrum in signals within a preset time window; and performing recursive smoothing processing on the target power spectrum to obtain the first power spectrum.

14. The non-transitory readable storage medium according to claim 12, wherein the performing noise reduction processing on a first speech signal according to a first time-frequency spectrum and a first power spectrum comprises:

determining a posterior signal-to-noise ratio corresponding to the first speech signal according to the first power spectrum and the power spectrum of the first speech signal, and performing recursive smoothing processing on the posterior signal-to-noise ratio to obtain a prior signal-to-noise ratio corresponding to the first speech signal;

determining a target noise reduction gain according to the posterior signal-to-noise ratio and the prior signal-to-noise ratio; and performing noise reduction processing on the first speech signal according to the first time-frequency spectrum and the target noise reduction gain.

15. The non-transitory readable storage medium according to claim 12, wherein the determining a damage compensation gain of the second speech signal according to the voiced signal on which the gain compensation has been performed comprises:

performing homomorphic inverse analysis processing on a first cepstral coefficient and the maximum cepstral coefficient on which the gain amplification processing has been performed, to obtain a first logarithmic time-frequency spectrum, wherein the first cepstral coefficient is a cepstral coefficient in the target cepstral coefficient other than the maximum cepstral coefficient; and determining a logarithmic time-frequency spectrum of the second speech signal according to a time-frequency spectrum of the second speech signal, and determining the damage compensation gain according to a difference between the first logarithmic time-frequency spectrum and the logarithmic time-frequency spectrum of the second speech signal.

16. The non-transitory readable storage medium according to claim 12, wherein the second speech signal is a signal obtained by performing noise reduction processing on a target frequency domain signal, and the target frequency domain signal is a signal obtained by performing a short-time Fourier transform on the first speech signal; and after the performing gain compensation on the second speech signal based on the damage compensation gain, the method further comprises:

performing time-frequency inverse transform processing on the second speech signal on which the gain compensation has been performed, to obtain a target time domain signal, and outputting the target time domain signal.

* * * * *